United States Patent
Liu et al.

(10) Patent No.: US 10,610,950 B2
(45) Date of Patent: Apr. 7, 2020

(54) MAGNETIC-AIDED ELECTROSPARK DEPOSITION

(71) Applicant: THE HONG KONG POLYTECHNIC UNIVERSITY, Hong Kong (HK)

(72) Inventors: Jiang Wen Liu, Guangzhou (CN); Tai Man Yue, Hong Kong (HK); Zhichao Liu, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 666 days.

(21) Appl. No.: 15/133,245

(22) Filed: Apr. 20, 2016

(65) Prior Publication Data

US 2017/0304924 A1    Oct. 26, 2017

(51) Int. Cl.
*B23K 9/26* (2006.01)
*B23K 9/04* (2006.01)
(Continued)

(52) U.S. Cl.
CPC .............. *B23K 9/26* (2013.01); *B23K 9/042* (2013.01); *B23K 9/32* (2013.01); *C23C 26/02* (2013.01);
(Continued)

(58) Field of Classification Search
CPC ...... B23K 9/26; B23K 9/042; B23K 2203/14; B23K 9/32; B23K 2203/05; C23C 26/02
(Continued)

(56) References Cited

U.S. PATENT DOCUMENTS 3,956,572 A * 5/1976 Gray .................. F27D 1/12
                                                      373/76
3,975,184 A * 8/1976 Akers .................. B22F 9/14
                                                      75/336

(Continued)

OTHER PUBLICATIONS

Electrospark Deposition for Depot- and Field-Level Component Repair and Replacement of Hard Chromium Plating, Final report Project WP-0202 (p. 11), Sep. 7, 2006, Environmental Security Technology Certification Program (ESTCP).
(Continued)

*Primary Examiner* — Dana Ross
*Assistant Examiner* — Kuangyue Chen
(74) *Attorney, Agent, or Firm* — Spruson & Ferguson (Hong Kong) Limited (57) ABSTRACT

A new electrospark deposition (ESD) method and related system are provided in the present invention based on the use of a magnetized electrode, namely magnetic-aided ESD (M-ESD). In particular, the present invention uses a magnetized electrode (either magnetized by an electro-magnet or being a permanent magnet) to attract fine coating powders at the tip thereof which acts as a soft brush to coat on intricate surface profiles. Accordingly, the method of the present invention is able to provide a soft contact between the magnetized anode and the workpiece to be coated or manipulated. The present invention is useful in various surface engineering applications in the fields of aeronautical (e.g. restoration and repair of damaged aircraft turbine blades), nuclear reactors, military engineering, and in medical industries. As compared to conventional ESD, the present invention can address complicated surface geometries and internal surfaces while the cost can be significantly lowered by using inexpensive components and simplified method steps.

19 Claims, 11 Drawing Sheets

(51) Int. Cl.
C23C 26/02 (2006.01)
B23K 9/32 (2006.01)
B23K 103/04 (2006.01)
B23K 103/14 (2006.01)

(52) U.S. Cl.
CPC ...... *B23K 2103/05* (2018.08); *B23K 2103/14* (2018.08)

(58) Field of Classification Search
USPC ..................................................... 219/76.13
See application file for complete search history.

(56) References Cited

U.S. PATENT DOCUMENTS

| | | | | |
|---|---|---|---|---|
| 4,044,379 | A | * | 8/1977 | Halter ............... G11B 3/44 386/279 |
| 4,256,918 | A | * | 3/1981 | Schwabe ............ H05B 7/101 373/93 |
| 5,712,612 | A | * | 1/1998 | Lee ................. B82Y 10/00 324/252 |
| 6,220,204 | B1 | * | 4/2001 | Makino .............. C23C 14/046 118/723 CB |
| 7,235,758 | B2 | * | 6/2007 | Ignatchenko ........ B23K 9/173 219/123 |
| 7,776,409 | B2 | * | 8/2010 | Goto .................. B22F 5/00 219/69.17 |
| 9,162,305 | B2 | * | 10/2015 | Brass ................. B23K 9/048 |
| 2002/0000369 | A1 | * | 1/2002 | Mohri ................ B23H 1/04 204/192.12 |
| 2003/0232223 | A1 | * | 12/2003 | Leddy ................ B01D 39/04 429/10 |
| 2008/0139971 | A1 | * | 6/2008 | Lockhart .............. A61N 7/00 601/2 |
| 2009/0078689 | A1 | * | 3/2009 | Brass ................. B23K 9/048 219/162 |
| 2012/0019332 | A1 | | 1/2012 | Hino et al. |
| 2016/0271906 | A1 | * | 9/2016 | Iwano ................ B32B 5/022 |
| 2017/0050370 | A1 | * | 2/2017 | Iwano ................ B29C 65/08 |
| 2017/0115792 | A1 | * | 4/2017 | Nishimura .......... G06F 3/0414 |
| 2018/0038587 | A1 | * | 2/2018 | Han ................... C11C 5/006 |

OTHER PUBLICATIONS

R.N. Johnson, J.A. Bailey, Joseph A. Goetz, Electro-spark deposited coatings for replacement of chrome plating, Armament Research, Development and Engineering Center, New Jersey, Report ARAET-CR-05002, Jun. 2005.

J. Qian, S. Steegen, E. Vander Poorten, D. Reynaerts, H. Van Brussel, EDM texturing of multicrystalline silicon wafer and EFG ribbon for solar cell application, International Journal of Machine Tools & Manufacture 42 (2002) 1657-1664.

Pavel Topală, Laurentiu Slătineanu, Oana Dodun, Margareta Coteață, and Natalia Pînzaru, Electrospark deposition by using powder materials, Materials and Manufacturing Processes 25 (2010) 932-938.

James L. Reynolds Jr., Richard L. Holden, Lawrence E. Brown, "Electro-spark Deposition", Advanced Materials & Processes, Mar. 2013, 35-37.

\* cited by examiner

MAGNETIC-AIDED ELECTROSPARK DEPOSITION

FIELD OF THE INVENTION

A new electrospark deposition (ESD) method and related system are provided in the present invention based on the use of a magnetized electrode, namely magnetic-aided ESD (M-ESD). In particular, the present invention uses an electro-magnetized electrode (anode) or a permanent magnet as a magnetized anode to attract fine coating powders at the tip thereof which acts as a soft brush to coat on intricate surface profiles. Accordingly, the method of the present invention is able to provide a soft contact between the electro-magnetized anode or the permanent magnet anode and the workpiece to be coated or manipulated.

BACKGROUND OF THE INVENTION

Figure 1:
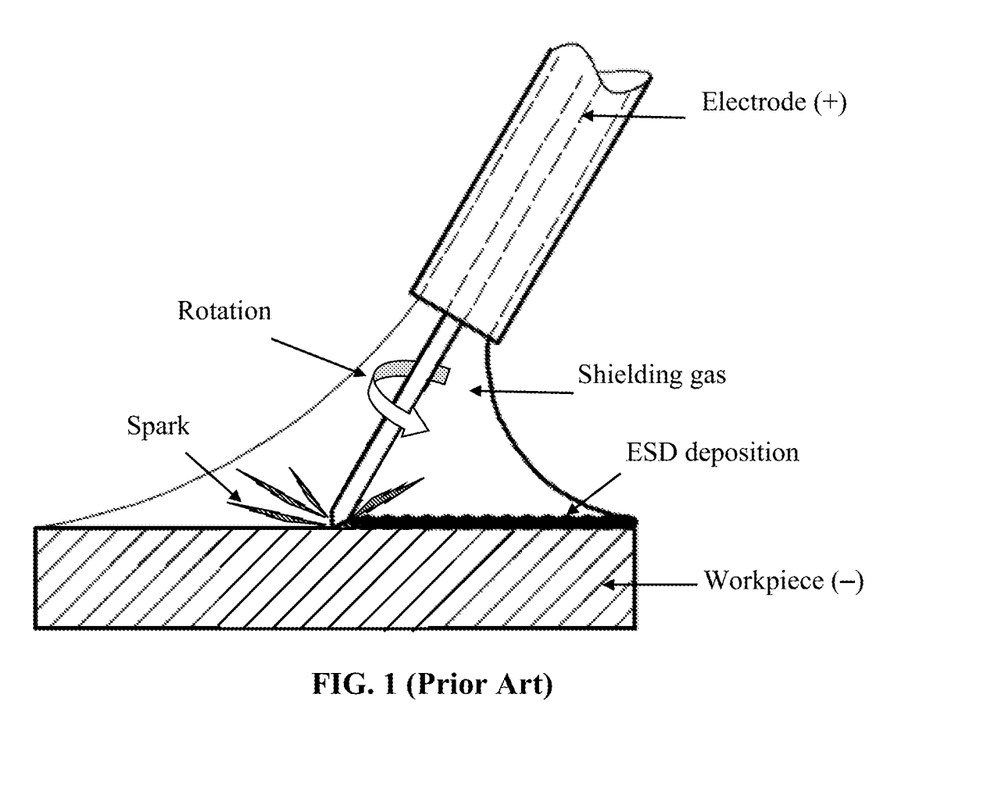
FIG. 1 shows a setup of a conventional ESD process.

Electrospark-deposit coatings have been recognized to be amongst the most damage-resistant coatings that are suitable for use in harsh environments [Electrospark Deposition for Depot- and Field-Level Component Repair and Replacement of Hard Chromium Plating, *Final report Project WP*-0202 (page 11), Sep. 7, 2006, Environmental Security Technology Certification Program (ESTCP)]. Unfortunately, similar to all other coating technologies, conventional electrospark deposition (ESD) has its own limitations and problems. One of these is the process's weakness in coping with complex surface geometries and internal surfaces, in particular, those with small features. The limitation arises because ESD normally employs a rigid solid, sizable consumable electrode (FIG. 1). Another problem of the process is the occurrence of unstable electrospark discharges. Unstable discharging will seriously undermine the quality of the coating. Despite being a difficult problem, many researchers have taken up this challenge to come up with better process designs in order to overcome the instability problem. A noticeable development was the work at the Pacific Northwest National Laboratory and the U.S. Army Armament Research Center [R. N. Johnson, J. A. Bailey, Joseph A. Goetz, Electro-spark deposited coatings for replacement of chrome plating, Armament Research, Development and Engineering Center, New Jersey, *Report ARAET-CR*-05002, June (2005)]. At there, researchers developed a sophisticated ESD system that can control the contact force precisely. The system is capable of controlling the electrode force to ±5 g during processing, an achievement claimed to be difficult to accomplish even by major robotics manufacturers. With such an advanced but expensive deposition system, good quality coatings can be produced.

Figure 2:
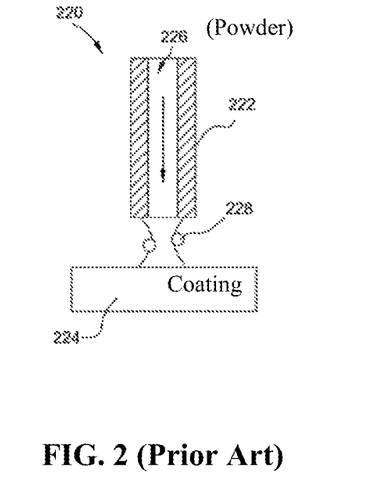
FIG. 2 shows a setup of another conventional ESD process.

In the US patent application publication 2012/0193329, Liu et al. makes use of powder as a feeding stock, but it does not involve any magnetic devices/forces. The powder simply passes through a "feed channel configured within or at least partially surrounding the electrode for guiding powder" (FIG. 2).

A related research paper on the use of loose powder in electrodischarge applications published by Reynaerts et al. [J. Qian, S. Steegen, E. Vander Poorten, D. Reynaerts, H. Van Brussel, EDM texturing of multicrystalline silicon wafer and EFG ribbon for solar cell application, *International Journal of Machine Tools & Manufacture* 42 (2002) 1657-1664] has described the employment of magnetized metal powder to surface texturing of Si substrates using electrodischarge machining. The aim was to roughen Si wafers and ribbons for solar cell application. In other words, Reynaerts et al. only teaches the electrodischarge technique of using metal powder functions as a thermal erosion process (subtractive) rather than an additive deposition method as in the present invention.

Figure 3:
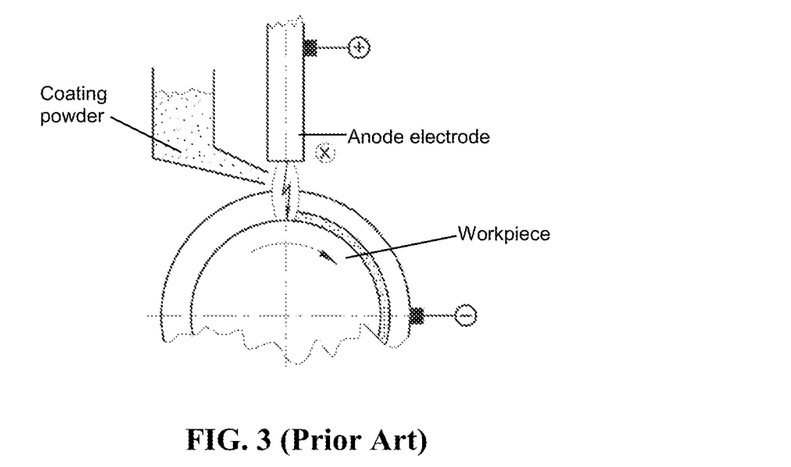
FIG. 3 shows a setup of other conventional ESD process.

In another related research paper on the subject of using loose powder materials for ESD by Topală et al [Pavel Topală, Laurenţiu Slătineanu, Oana Dodun, Margareta Coteaţă, and Natalia Pînzaru, Electrospark deposition by using powder materials, *Materials and Manufacturing Processes* 25 (2010) 932-938]. Topală et al. describes the employment of a relatively high voltage (up to 12 kV) between the electrode and the workpiece to initiate electrical discharges across a relatively large spark gap, without direct contact having been made between the electrodes. Once a discharge plasma channel has formed, the powder for alloying or coating is then fed into the channel (FIG. 3), so as to melt and deposit the material on the external surface of a cylinder. This process has the disadvantages of needing to use a relatively high voltage, therefore high energy, and the process is unsuitable for processing parts with complex surface contours and shapes. For this process the anode is not magnetized and does not behave like a soft brush.

SUMMARY OF THE INVENTION

The present invention employs a magnetized electrode (anode) with ultrasonic vibration or any relative motions (such as rotary). The employment of said ultrasonic vibration or any of the relative motions is necessary to provide an appropriate spark gap between the anode and the workpiece to achieve a stable mode of discharge.

Accordingly, in the first aspect of the present invention, it is provided a system comprising an anode, which can be an electromagnet or being a permanent magnet. Said system also comprises a cathode which is the workpiece to be manipulated. Said system further comprises a source of shielding gas to protect the processing area and the coating powder from being oxidized. Said system additionally comprises an ultrasonic generator exerting ultrasonic vibration to the magnetized anode. Alternatively, a rotary or a transverse device or the like (collectively called a relative motion generator) can be employed for exerting the relative motion to the anode. In one embodiment, the anode is an electromagnet or a permanent magnet with a type of loose ferromagnetic metal powder or a mixture of different coating powders comprising non-ferromagnetic (e.g. ceramic) and ferromagnetic powders surrounding the tip of the anode. When the system is in operation, the anode is electromagnetized or magnetized, thereby adhering the coating powders on the surface of the end of the electromagnetized or magnetized anode that is to be in contact with the workpiece, which behaving like a soft brush. The coating powders adhered on the surface of the end of the electromagnetized or magnetized anode conform to the surface profile of the workpiece when the electro-magnetized or magnetized anode and the workpiece (the cathode) are brought together. The way of which the present system to process a workpiece is different from the conventional ESD in that the conventional ESD employs a rigid non-magnetized solid anode electrode and requires a direct contact force to be exerted on the solid anode, whereas the present invention does not require the exertion of direct contact force on the anode but simply a "soft" contact between the powders on the anode and the workpiece is sufficient. By the present invention, intricate surface profiles including internal walls of a workpiece (e.g., flat and non-flat surfaces of a non-straight channel-like hollow structure) can also be coated with the coating materials, which is not possible to be achieved by the conventional ESD because of the requirement of a rigid solid anode rod and it is a line-of-sight process. In operation, the working principle of the present system is that the spark breaks down when the "soft" contact between the powders on the anode and the workpiece is broken as a result of the ultrasonic vibration generated by said generator. Alternatively, the breaking of contact can also be achieved by means of a device which provides the relative motion between the anode and the workpiece. A micro-gap is momentarily created in which spark plasma is produced, with the size controlled by the amplitude of the vibration of the anode (i.e. the gap size is increased by the vertical displacement of the ultrasonically activated anode away from the workpiece). Electrospark discharging ends when the pressure of the plasma collapses, leading to expel of small molten droplets of the coating powders from the anode and deposition thereof onto the workpiece surface. By moving the workpiece on a movable working table or by means of moving the anode with the above steps repeated, a coated surface is generated.

In the second aspect of the present invention, a method for coating based on magnetic-aided electrospark deposition is provided. The method comprises fixing the anode of the present system to a movement drive system, magnetizing the anode by an electromagnet or configuring said anode as a permanent magnet such that coating powders are adhered onto a tip of the anode where it is in contact with a workpiece which is the cathode of the system and placing the workpiece on the movable working table, setting an ultrasonic vibration amplitude of ultrasonic vibration generated by the ultrasonic generator, switching on the ultrasonic generator to exert ultrasonic vibration to the anode, switching on a power supply which is connected to said anode and cathode to create a spark at the micro-gap, discharging the coating powders which is adhered onto the tip of the anode to a surface of the workpiece when the size of the micro-gap is increased by the vertical displacement of the anode away from the workpiece such that plasma pressure of the spark is decreased, and moving the workpiece on the movable working table and/or by moving the anode such that the above steps are repeated to deposit the coating materials onto the remaining surface of the workpiece. As an alternative, said ultrasonic generator can be replaced by a motion device or the like to exert a relative movement between the anode and the workpiece such that the size of the micro-gap between the anode and the workpiece is increased. Alternatively, the relative movement can be introduced by moving the workpiece. The degree and extent of the relative motion should be set before it is switched on to ensure the motion exerted to the anode will be sufficient for the coating powders to discharge when the plasma pressure of the spark is decreased.

DETAILED DESCRIPTION OF THE INVENTION

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a voltage range of "about 0.1V to about 5V" should be interpreted to include not only the explicitly recited voltage of about 0.1V to about 5V, but also the individual voltage (e.g., 1V, 2V, 3V, and 4V) and the sub-ranges (e.g., 0.1V to 0.5V, 1.1V to 2.2V, and 3.3V to 4.4V) within the indicated range.

As described herein, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods or processes described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed method. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting method will fall within the literal scope of the claimed method.

Figure 4:
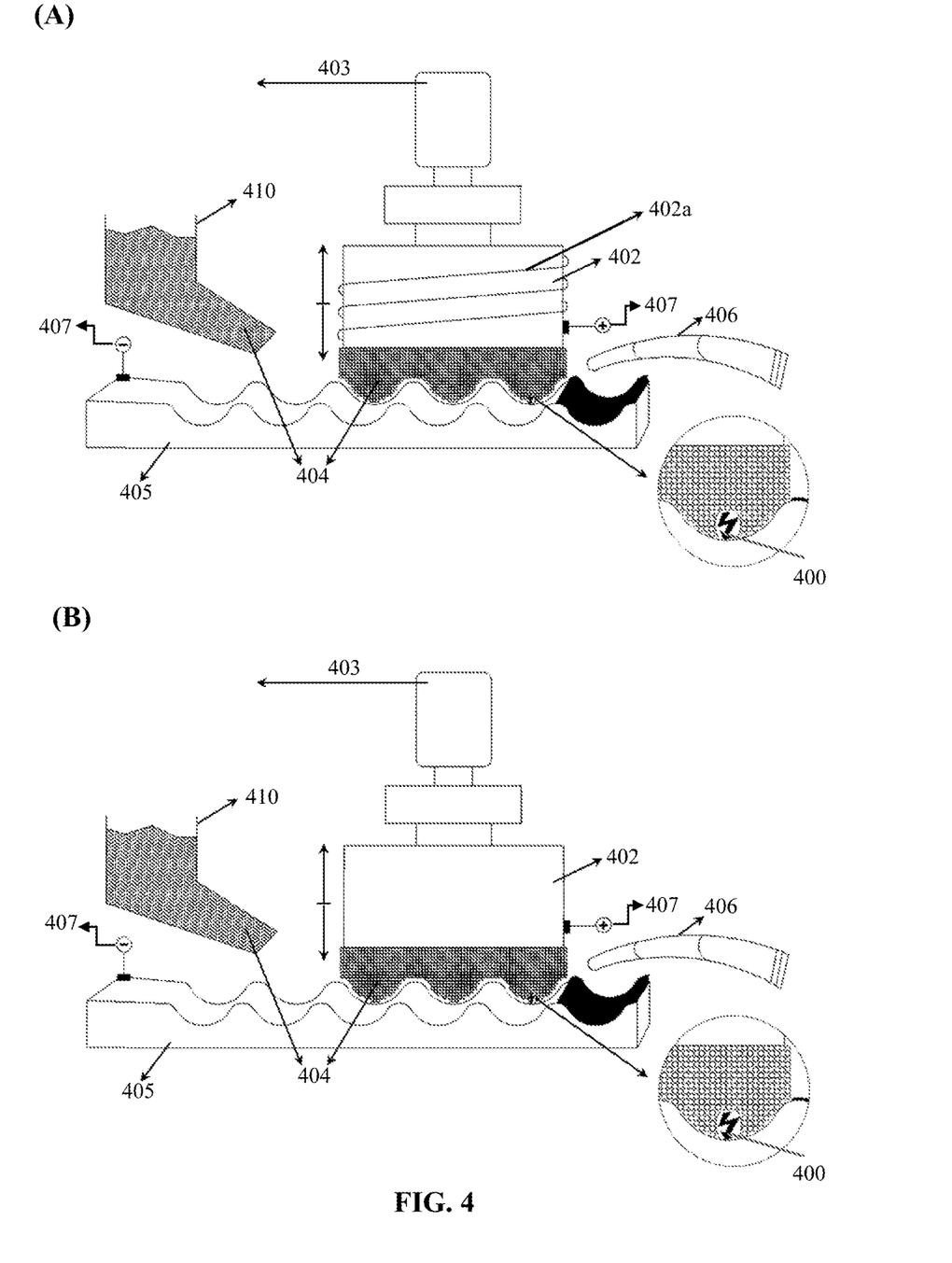
FIG. 4 is a schematic diagram of a setup of the magnetic-aided ESD (M-ESD) method according to an embodiment of the present invention: (A) the structure of the present system according to an embodiment of the present invention for processing external surfaces; (B) the structure of present system according to another embodiment of the present invention; (C) the present system for use in processing internal non-straight surfaces of a workpiece with a magnified view of "I" showing magnetized powder conforms to the curve of the channel wall which is to be coated; (D) a cross-sectional view of the magnetized anode from (C) along the axis (A-A).

The present invention is not to be limited in scope by any of the following descriptions. The following examples or embodiments are presented for exemplification only:

In FIG. 4A, the system according to an embodiment of the present invention to perform the M-ESD method comprises an anode (402), an ultrasonic generator (403), a workpiece (cathode) connected to the negative polarity (405), and a source of shielding gas (406) (e.g., argon flow). Said anode (402) is connected to the ultrasonic generator (403). Said anode (402) is ultrasonically vibrated when the ultrasonic generator (403) is switched on. The amplitude of the ultrasonic vibration generated by the ultrasonic generator (403) is transmitted to said anode (402). Said anode (402) is also magnetized by an electro-magnet (402a in FIG. 4A) or is configured as a permanent magnet (in FIG. 4B) such that coating powders (404) can be adhered at the tip of said anode (402) when the electromagnet is activated. Said anode (402) and said cathode (405) are connected to a direct-circuit (DC) power supply (407). The magnetic force generated by the electromagnet can be controlled by a separate DC power supply (not shown in this figure). During operation, as a result of electrospark actions (400 in small inset of FIGS. 4A and 4B), the coating powders are consumed and continuously deposited onto the workpiece. The coating powders can be replenished by using either an external powder carrier to supply powder directly to the tip of the magnetized anode or an external powder feeder (410) to lay powder on the surface of the workpiece. A movable table (not shown in this figure) can be used to move the workpiece under the anode. In this embodiment, the anode behaves like a "soft" brush, and when coating powders are melted as a result of the discharge action, it deposits onto the workpiece surface.

FIG. 4C illustrates another embodiment of the present invention, in which the magnetized anode (402) of the present system is applied to a non-straight internal channel wall of a workpiece (405). In this example, the anode (402) itself is a magnet which is also capable of creating spark for electrospark deposition. A magnified view of "I" as a small inset in FIG. 4C shows that the distribution of the coating powders (404) and the internal channel wall of the workpiece (405). FIG. 4D illustrates the cross-section of the magnetized anode (402) in a channel of the workpiece (405), in between is the coating powders (404). The magnetized anode (402) and the workpiece (cathode) (405) are connected to the power supply (407). The magnetized anode (402) can comprise an electromagnet or be a permanent magnet which is also capable of creating spark.

Figure 5:
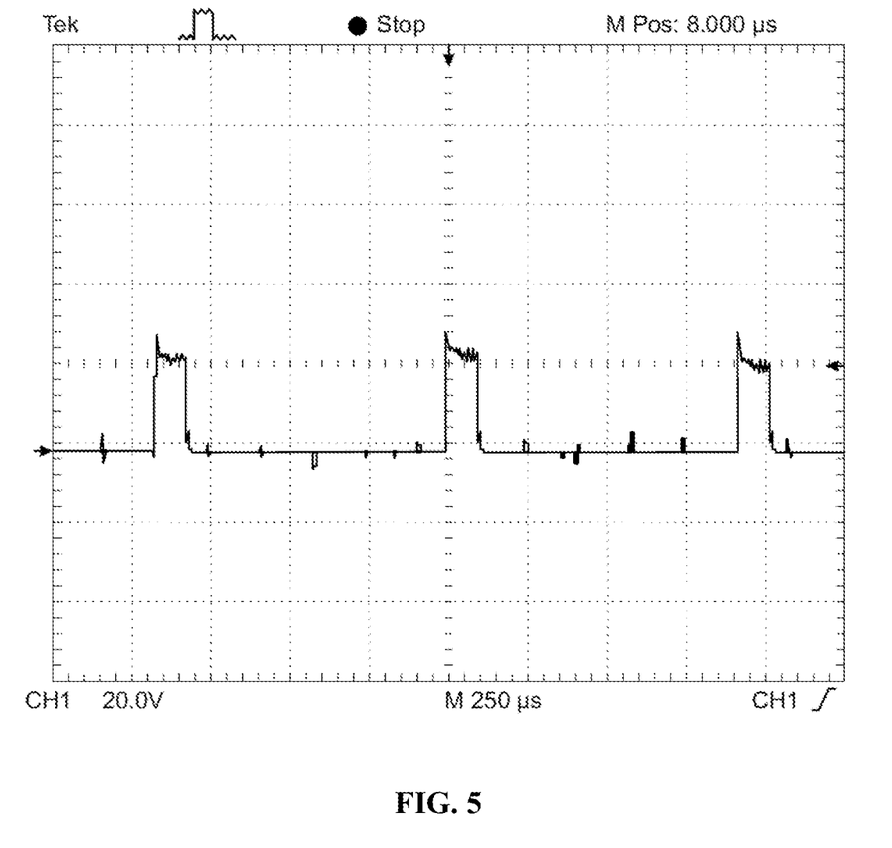
FIG. 5 illustrates an example of voltage output waveforms of the M-ESD method according to an embodiment of the present invention.
Figure 7:
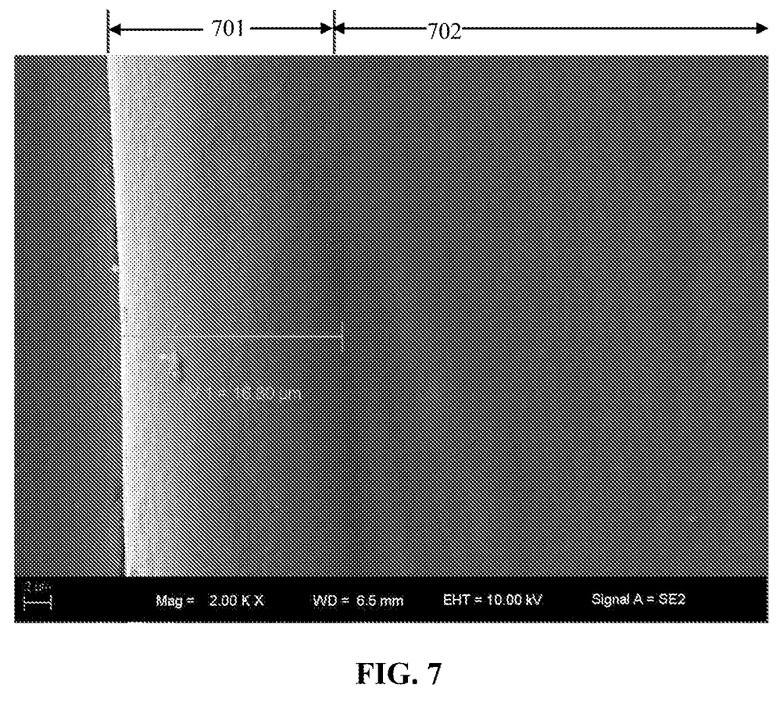
FIG. 7 shows a cross-sectional view of a ferrous coating on the workpiece prepared by the M-ESD method according to an embodiment of the present invention.
Figure 8:
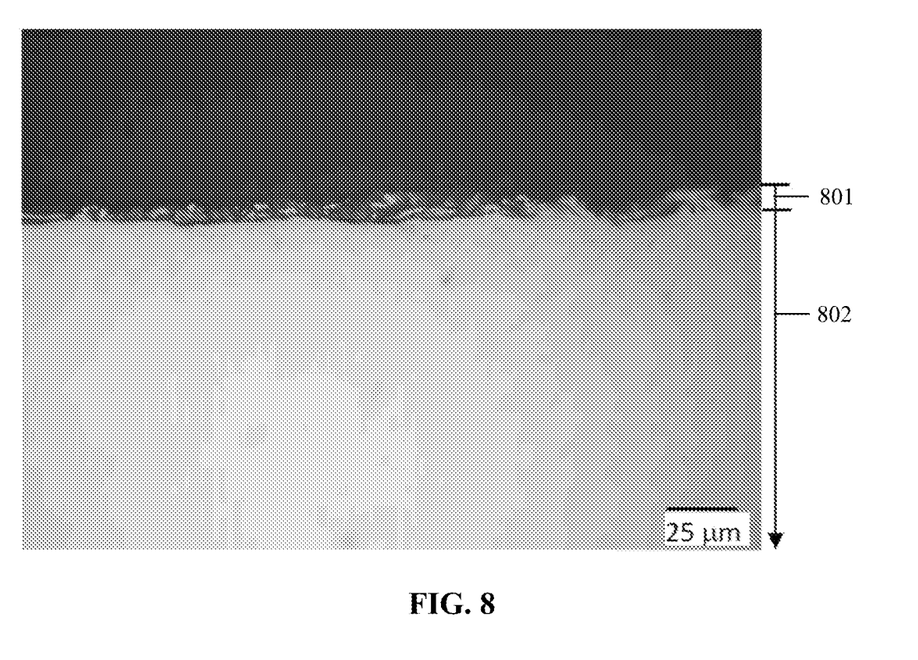
FIG. 8 shows a cross-sectional view of a cermet coating (nickel metal reinforced with boron nitride particle) on a stainless steel substrate according to an embodiment of the M-ESD method of the present invention.
Figure 9:
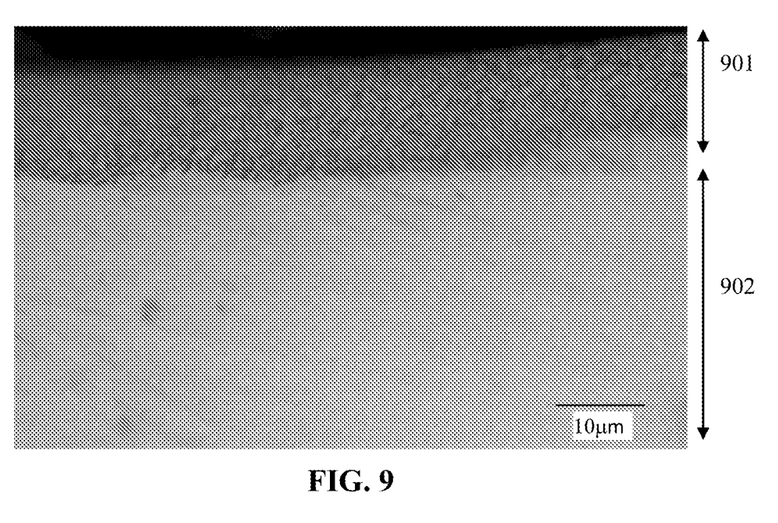
FIG. 9 shows a cross-sectional view of another cermet coating (nickel metal reinforced with silicon carbide (SiC) particle) on a stainless steel substrate according to an embodiment of the M-ESD method of the present invention.

FIG. 5 shows an example of voltage output waveforms of the M-ESD method according to an embodiment of the present invention which uses a magnetized anode (permanent magnet) in the presence of the ultrasonic vibration generated by an ultrasonic generator. The pattern of the waveforms reveals that the processing condition is stable and the resulting workpiece is defect free. The coating materials used in this example is iron powders and the substrate to be coated with the coating materials is titanium. The cross-section of the resulting product is shown in FIG. 7. Besides ferromagnetic materials, the present M-ESD process can also be applied to other coating materials (Cermet, a composite material composed of ceramic (cer) and metallic (met) materials) and other substrates. FIGS. 8 and 9 show two other examples using the present method to coat Cermet materials onto other substrate. Examples of other coating materials include nickel, cobalt, boron nitride and silicon carbide, or any combination of the ferromagnetic and non-ferromagnetic materials as described herein.

Figure 6:
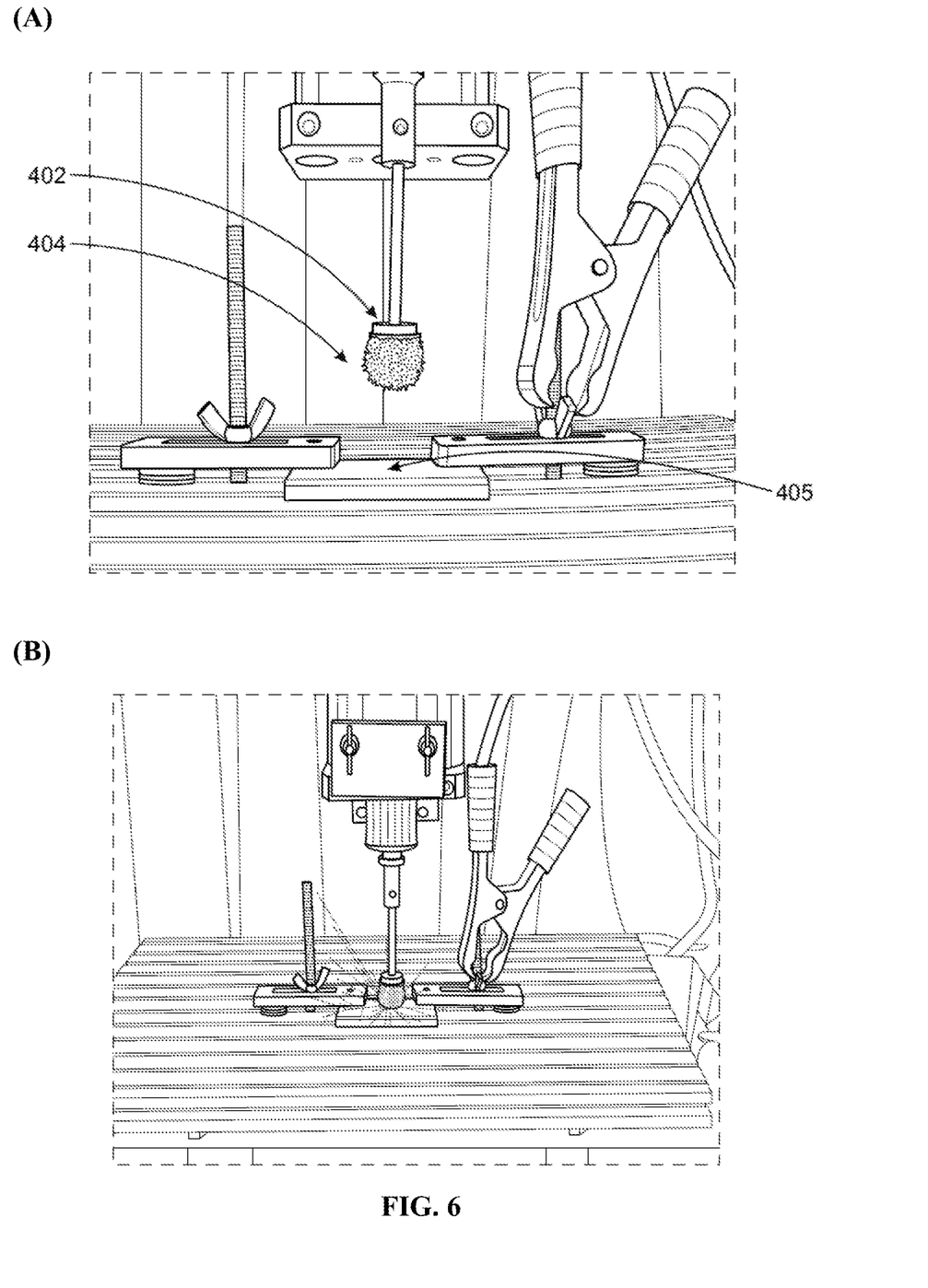
FIG. 6 shows images of the setup of the M-ESD method according to an embodiment of the present invention: (A) before the anode rests against a workpiece to be manipulated; (B) the anode is in progress of coating the powders onto a surface of the workpiece.

FIG. 6A is an image of the setup of the present system before the anode (402) rests against the workpiece (405). The anode (402) is magnetized such that the coating materials (404) are adhered on the tip of the anode (402). FIG. 6B is another image of the same setup as in FIG. 6A during operation according to the M-ESD method of the present invention, in which sparking occurs.

FIG. 7 shows the cross-section of a dense Fe-coating (701) coated on a Ti substrate (702) according to the M-ESD method of the present invention.

FIG. 8 shows the cross-section of a Cermet coating (boron nitride (BN) with Ni) (801) formed on a stainless steel substrate (802) according to the M-ESD method of the present invention.

FIG. 9 shows the cross-section of another Cermet coating (SiC with Ni) (901) formed on a stainless steel substrate (902) according to the M-ESD method of the present invention.

Figure 10:
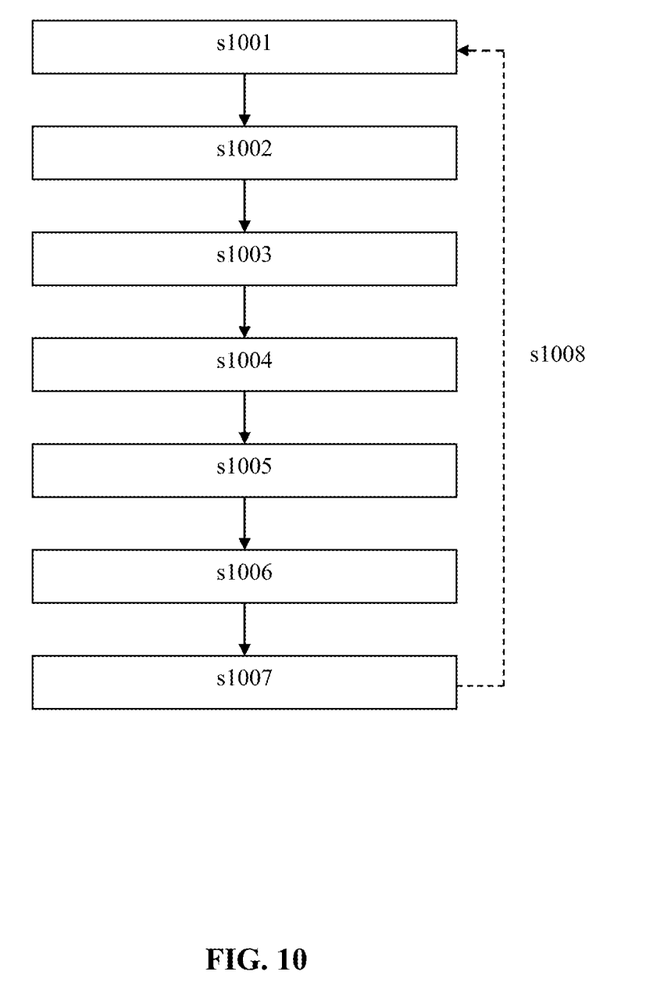
FIG. 10 depicts key steps of the present M-ESD method.

FIG. 10 is a flowchart illustrating the M-ESD method based on the system of the present invention. The method comprises: (s1001) connecting the anode of the present system to a movement drive system, (s1002) magnetizing the anode by an electromagnet or magnet such that the coating powders are adhered on to a surface where it is in physical contact with a workpiece (cathode), (s1003) of the system and placing the workpiece on the movable working table, (s1004) setting an ultrasonic vibration amplitude of an ultrasonic generator, (s1005) switching on the ultrasonic generator to exert ultrasonic vibration to the anode, (s1006) switching on a power supply which is connected to said anode and cathode to create a spark at the micro-gap, (s1007) discharging the coating powders which is adhered on the surface of the anode to a surface of the workpiece when the size of the micro-gap is increased by the vertical displacement of the anode away from the workpiece such that plasma pressure of the spark is decreased. An optional step s1008 for moving the workpiece on the movable working table can be carried out followed by repeating the above steps s1001 to s1007 to deposit the coating powders onto the remaining surface of the workpiece until the whole surface of the workpiece is deposited with the coating materials. Alternatively, the anode is manipulated instead of moving the workpiece such that the above steps s1001 to s1007 can be repeated to deposit the coating powders onto the remaining surface of the workpiece. In one embodiment, the voltage applied to the magnetized electrode (anode) ranges from 20V to 120V. Accordingly, the amplitude of ultrasonic vibration exerted by the ultrasonic generator ranges from 2 µm to 10 µm with the ultrasonic frequency fixed at 25 kHz. Preferably, the voltage applied to the electrode is at 40V for the coating shown in FIG. 7. While, for the coatings shown in FIG. 8 and FIG. 9, the applied voltage are at 25V and 40V, respectively. With regard to vibration amplitude, preferably, the amplitude is set at 10 µm for the coating in FIG. 7; whereas, for the coatings in FIGS. 8 and 9, the amplitude is both set at 6 µm.

During the M-ESD method, as a result of electrospark actions, the coating powder will be consumed and continuously deposited onto the workpiece. The coating powders can be replenished by using either an external powder carrier to supply powder to the tip of the anode or an external feeder to lay powder on the surface of the workpiece. It is noted that any steps depicted in FIG. 10 can be re-ordered and/or omitted according to the needs in different applications. It is also noted that the working angle between the electrode (anode) and the surface of the workpiece can be adjusted according to different needs such as surface profile of the workpiece. The coating materials can be ferromagnetic in nature or cermets comprising different ferromagnetic and non-ferromagnetic materials; the substrate or the workpiece which is to be coated with the coating materials can be ferrous or non-ferrous.

INDUSTRIAL APPLICABILITY

The present invention is useful in various surface engineering applications in the fields of aeronautical (e.g. restoration and repair of damaged aircraft turbine blades), nuclear reactors, military engineering, and in medical industries. As compared to conventional ESD, the present invention can address complicated surface geometries and internal surfaces while the cost can be significantly lowered by using inexpensive components and simplified method steps.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments are chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for depositing a material onto a surface of a workpiece comprising:
   a coating powder consisting of a coating material same as the material to be deposited onto the surface of the workpiece;
   a magnetized anode for attracting the coating powder onto a surface of the magnetized anode by magnetic force such that the coating powder is adhered on the surface of the magnetized anode by the magnetic force, the magnetized anode being arranged to connect to a power supply for creating a spark plasma between the coating powder adhered on the surface of magnetized anode and the surface of the workpiece; and
   a relative motion generator connected to the magnetized anode for exerting a relative motion to the magnetized anode for moving the magnetized anode to and away from the workpiece for creating a spark gap between the coating powder adhered on the surface of magnetized anode and the surface of workpiece for creating the spark plasma at the spark map for melting the coating powder to discharge the melted coating powder onto the surface of the workpiece thereby depositing the material onto the surface of the workpiece;
   wherein the magnetized anode is not consumed during depositing the material onto the surface of the workpiece such that the coating powder adhered on the surface of the magnetized anode by the magnetic force provides a soft contact between the coating powder adhered on the surface of magnetized anode and the surface of the workpiece to conform to different surface profiles of the workpiece such that the melted coating powder is capable of being deposited onto complicated surface geometries, an internal surface, or a combination thereof; and
   wherein the coating powder adhered on the surface of the magnetized anode avoids melting of the magnetized anode during depositing the material onto the surface of the workpiece such that the material to be deposited onto the surface of the workpiece consists of the coating material of the coating powder.

2. The system of claim 1, wherein the magnetized anode comprises an electromagnet connected to another direct current power supply for generating the magnetic force.

3. The system of claim 1 further comprising a movable working table and a movement drive system, wherein the workpiece is fixed on the movable working table which is capable of moving in different directions while the magnetized anode is fixed to the movement drive system.

4. The system of claim 1, wherein the coating material comprises a ferromagnetic material or a mixture of a ferromagnetic material and a non-ferromagnetic material.

5. The system of claim 1, wherein the coating material comprises iron, nickel, cobalt, boron nitride, silicon carbide, or any combinations thereof.

6. The system of claim 1, wherein the workpiece is metallic.

7. The system of claim 1, wherein the workpiece comprises a titanium substrate or a stainless steel substrate.

8. The system of claim 1, wherein the surface of the workpiece comprises external surfaces, internal surfaces, or a combination thereof.

9. The system of claim 1, wherein the magnetized anode comprises a permanent magnet.

10. The system of claim 1, wherein the relative motion generator is further configured to generate a rotary motion to the magnetized anode for creating the spark gap to achieve a stable mode of discharge between the coating powder adhered on the surface of the magnetized anode and the surface of the workpiece.

11. A method for depositing a material onto a surface of a workpiece, the method comprising:
   a) providing the system of claim 1;
   b) attracting the coating powder the material onto a surface of the magnetized anode by magnetic force such that the coating powder is adhered on the surface of the magnetized anode by the magnetic force;
   c) exerting a relative motion to the magnetized anode for moving the magnetized anode to and away from the workpiece for creating a spark gap between the coating powder adhered on the surface of the magnetized anode and the surface of the workpiece, wherein the coating powder adhered on the surface of the magnetized anode by the magnetic force provides a soft contact between the coating powder adhered on the surface of magnetized anode and the surface of the workpiece to conform to different surface profiles of the workpiece;

d) applying a voltage to the magnetized electrode by a power supply for creating a spark plasma at the spark gap for melting the coating powder, wherein the coating powder adhered on the surface of the magnetized anode avoids melting of the magnetized anode; and e) discharging the melted coating powder from the surface of the magnetized anode to the surface of the workpiece such that the material is deposited onto the surface of the workpiece, wherein the material to be deposited onto the surface of the workpiece consists of the coating material of the coating powder.

12. The method of claim 11, wherein the voltage applied to the magnetized anode is from 20V to 120V.

13. The method of claim 11, wherein after the discharging, the workpiece is moved on a movable working table, or the magnetized anode is moved by using a movement drive system, such that the steps (a) to (e) are repeated to deposit the material onto a remaining surface of the workpiece.

14. The method of claim 11, wherein the coating material comprises a ferromagnetic material or a mixture of a ferromagnetic material and a non-ferromagnetic material.

15. The method of claim 11, wherein the coating material comprises iron, nickel, cobalt, boron nitride, silicon carbide, or any combinations thereof.

16. The method of claim 11, wherein the workpiece is metallic.

17. The method of claim 11, wherein the workpiece comprises a titanium substrate or a stainless steel substrate.

18. The method of claim 11, wherein the magnetized anode comprises an electromagnet or a permanent magnet.

19. The method of claim 11, wherein the surface of the workpiece is a non-straight internal channel wall.

* * * * *